United States Patent
Simba

(10) Patent No.: US 6,446,799 B1
(45) Date of Patent: Sep. 10, 2002

(54) CD CASE FRAMER

(76) Inventor: Leonard L. Simba, 193 Dexter Street, Winnipeg Manitoba (CA), R2R 2L7

( * ) Notice: Subject to any disclaimer, the term of this patent is extended or adjusted under 35 U.S.C. 154(b) by 0 days.

(21) Appl. No.: 09/813,728

(22) Filed: Mar. 22, 2001

(51) Int. Cl.$^7$ .............................................. B65D 85/57
(52) U.S. Cl. ..................................... 206/308.1; 206/312
(58) Field of Search ..................... 206/308.1, 309–313, 206/307; 241/41.12

(56) References Cited

U.S. PATENT DOCUMENTS

| | | | |
|---|---|---|---|
| 4,573,749 A | | 3/1986 | Massaro |
| 4,867,306 A | | 9/1989 | Factor |
| 4,932,522 A | * | 6/1990 | Milovich ..................... 206/309 |
| 5,040,687 A | | 8/1991 | Whittington |
| 5,244,084 A | * | 9/1993 | Chan .......................... 206/309 |
| 5,341,942 A | | 8/1994 | James, Jr. |
| 5,351,835 A | | 10/1994 | Hallgren |
| 5,370,224 A | * | 12/1994 | Karakane et al. ........... 206/309 |
| 5,372,263 A | | 12/1994 | Niekel |
| 5,437,376 A | | 8/1995 | Larsen |
| 5,518,125 A | | 5/1996 | Colosimo |
| 5,857,566 A | * | 1/1999 | Fu ........................... 206/307.1 |
| 6,073,762 A | * | 6/2000 | Hayakawa ............... 206/308.1 |
| 6,073,764 A | | 6/2000 | Haas |
| 6,073,765 A | * | 6/2000 | Liu .......................... 206/308.3 |
| 6,082,836 A | * | 7/2000 | Marshall et al. ........... 412/9.57 |
| 6,116,432 A | | 9/2000 | Rohner |
| 6,118,757 A | * | 9/2000 | Olsen et al. ................ 369/291 |

FOREIGN PATENT DOCUMENTS

DE 19722392 12/1998

OTHER PUBLICATIONS www.cdframes.com 1 800 640 036.

* cited by examiner

*Primary Examiner*—Shian Luong

(57) ABSTRACT

A wall or vertically mounted frame for holding and displaying single compact disc case comprising of a swing out holder pivoted to a fixed housing.

| | | | |
|---|---|---|---|
| 10 | swing out holder | 20 | fixed housing |
| 11 | foot plate | 21 | top wall |
| 12 | bracket | 22 | right side wall |
| 13 | spring | 23 | pivot pins |
| 14 | pivot rings | 24 | mounting cutout |
| 15 | stopper | | |
| 16 | access window | | |
| K | CD case | | |
| K1 | right most side of CD case | | |
| K2 | left most side of CD case | | |
| K3 | bottom part of CD case | | |

11 Claims, 3 Drawing Sheets

CD CASE FRAMER

CROSS-REFERENCE RELATED APPLICATIONS

| Application Number | Date Filed in U.S. |
|---|---|
| 194-316 | November 24, 1998 |
| 323-982 | June 1, 1999 |
| 311-113 | September 23, 1994 |
| 174-930 | December 29, 1993 |
| 070-438 | June 04, 1993 |
| 037-312 | March 25, 1993 |
| 959-973 | October 13, 1992 |
| 543-455 | June 26, 1990 |
| 138-218 | December 28, 1987 |

Present search yielded no prior arts directly related to this invention. The above listed applications only mention the different and varyng methods of framing and displaying CD cases. They have no claim on the benefit to this submitted invention.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to wall or vertically mounted frame specifically to a device that securely holds and displays a single compact disc case.

CD cases, compact disc cases or jewel cases are commonly transparent plastic containers that protect and keep individual CD's. They are labeled with front cover arts depicting their content. And since CD's are becoming a common home and office items, their cases whether empty or not are commonly stacked without giving attention to their cover arts. CD racks or towers are space savers that are used to efficiently store CD cases. They do this by stacking CD's with only the title edge visible.

Inventors created various types of CD frames or holders and disclose types of wall mounted or free standing racks which can hold several CD cases in the following U.S. patents;

| | |
|---|---|
| 6,116,432 to Rohner (2000) | 5,341,942 to James, Jr. (1994) |
| 6,073,764 to Haas (2000) | 5,372,263 to Nielkel (1994) |
| 5,518,125 to Colosim (1996) | 5,040,687 to Whittington (1991) |
| 5,437,376 to Larsen (1995) | 4,867,306 to Factor (1989) |
| 5,351,835 to Hallgren (1994) | |

Prior arts listed above have paid attention to displaying the CD case cover arts but they were typically modular racks or having plurality of frames and therefore serving the same purpose of framing or displaying multiple CD cases. Some make use of profiled bars or rails, hook-and-loop, contact adhesives, etc. to mount or hold few to several compact disc cases.

Aside from ordinary CD's, CDR's or recordable CD's, and CDRW's or rewritable CD's are now getting popular and becoming commonplace. Many people record and create their own music or programs and store their digital photos on those CD's. To make a distinction from the commercial music and software CD's, I think many people wants to display separately their favorite or personal CD's in a special place at home or office. They feel proud to show these to friends and visitors in the same way they feel about certificates and diplomas hung on the wall.

BRIEF SUMMARY OF THE INVENTION

This is where the idea behind my CD case framer comes in because my CD case framer specifies single CD case holder. It features a secure method of framing a CD case by using a swing out holder pivoted to a fixed housing.

Accordingly, the objects and advantages of my CD case framer of the present invention are:

(a) to be able to display a single favorite or personal CD case without having to display and mix them with all the rest of CD's or completely fill the typical CD tower, rack, frame or holder;

(b) to be able to securely hang or vertically mount a CD case without having to use permanent or semi permanent fixing devices on a CD case like adhesives, hook-and-loop, etc. thus preserving the CD case in its original form and making it convenient to stow it back to their storage racks or boxes whenever the owner wants;

(c) to provide a CD case framer which can be displayed in a way not possible with multiple or modular frames. For example, displaying CD cases on narrow walls, in between picture frames, souvenirs, memorabilia, etc;

(d) to be able to create various patterns by using several of these CD case framers. Example is an art mosaic consisting of several CD case framers mounted edge to edge vertically, horizontally, diagonally, etc. to cover a specific wall area or to form any artistic shapes.

DETAILED DESCRIPTION OF THE INVENTION

Typical Embodiment

Figure 1:
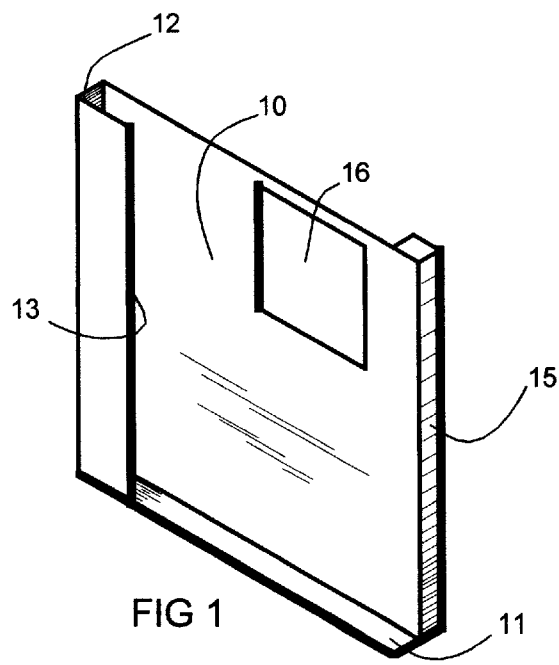
FIG. 1 is an isometric front view of a swing out holder.
Figure 2:
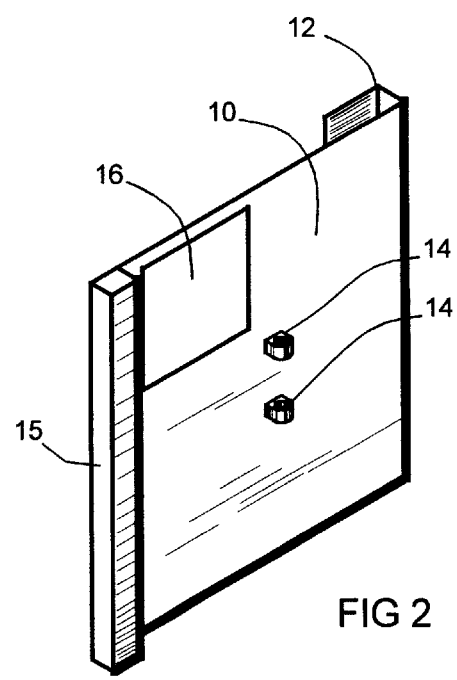
FIG. 2 is an isometric back view of a swing out holder.
Figure 3:
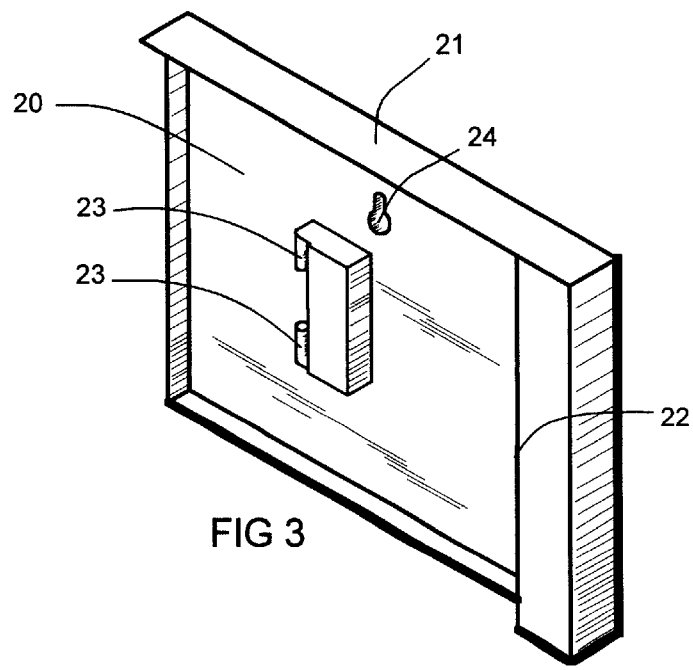
FIG. 3 is an isometric front view of a fixed housing.

A CD case framer consists of a swing out holder 10 (FIGS. 1, 2) pivoted to a fixed housing 20 (FIG. 3).

Figure 4:
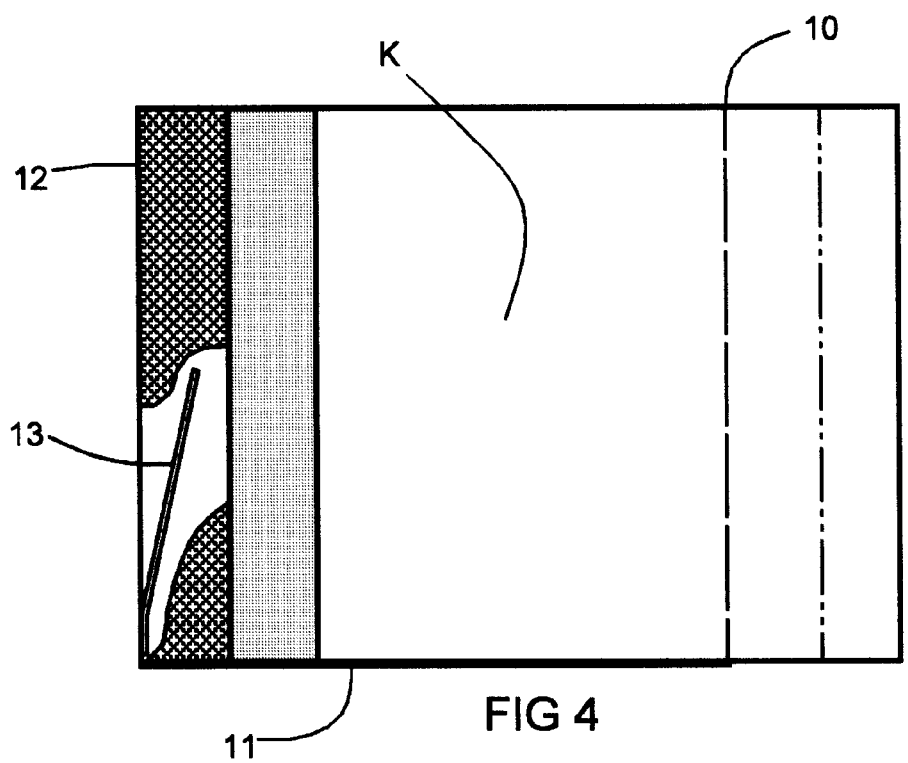
FIG. 4 is a cut out view of the bracket showing a spring acting on the edge of the compact disc case.

A swing out holder 10 (FIG. 1) is a plane of suitable thickness having a perpendicular foot plate 11. Left side bracket 12 forms a vertical channel with holder 10 plane. A spring 13 is fastened within the perpendicular side of bracket 12 (FIG. 4). On the back side of swing out holder 10 (FIG. 2) are two predisposed coaxial pivot rings 14 which is part of a pivot set. A stopper 15 serves as a support leg. An access window 16 is a cutout on swing out holder plane.

A fixed housing 20 (FIG. 3) is a plane of suitable thickness bounded by four walls. A top wall 21 and a right side wall 22 are relatively higher than their corresponding opposite walls. Also, wall 22 is thicker than the rest of the walls to give aesthetic balance with the swing out holder 1. Mounted on housing 20 are two predisposed pivot pins 23 fixed on a block. A mounting cutout 24 on the housing plane is for wall or vertical mounting means.

Figure 5:
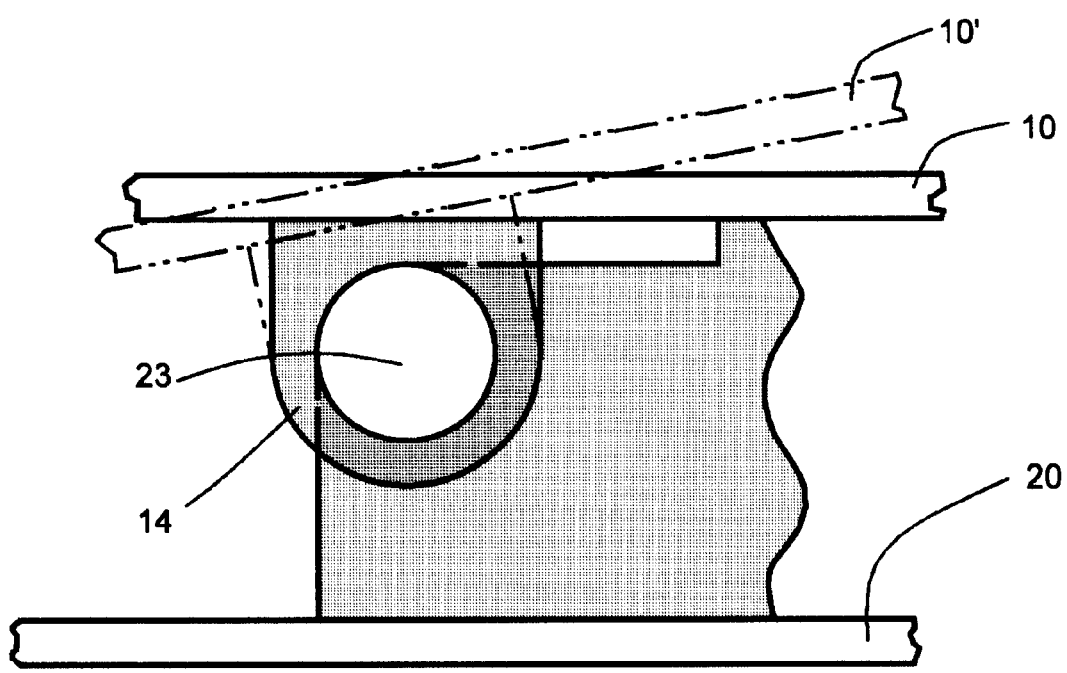
FIG. 5 is a side view detail of pivot unit.
Figure 6:
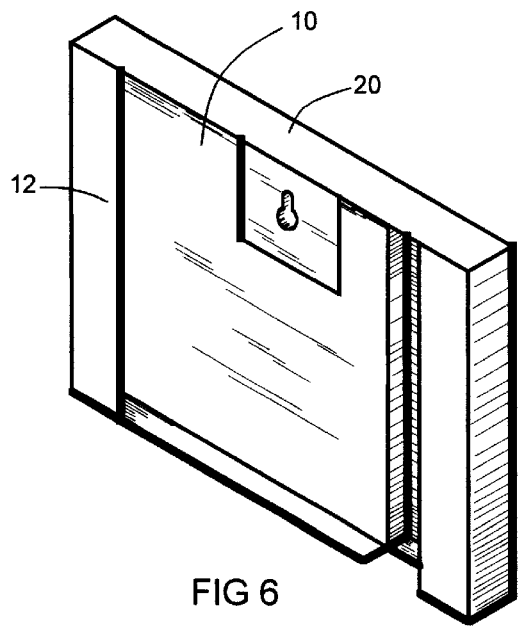
FIG. 6 is a CD case framer in close position without a CD case.

In the assembled form, pivot rings 14 fit housing pivot pins 23 (FIG. 5) only in one way and forms a complete CD case frame. Even in the assembled form cutout 24 is accessible because of access window 16 (FIG. 6).

Multiple assembly made up of individual frames can be made by joining the edges vertically, horizontally and/or combination of both to form a larger frame.

OPERATION

Figure 7:
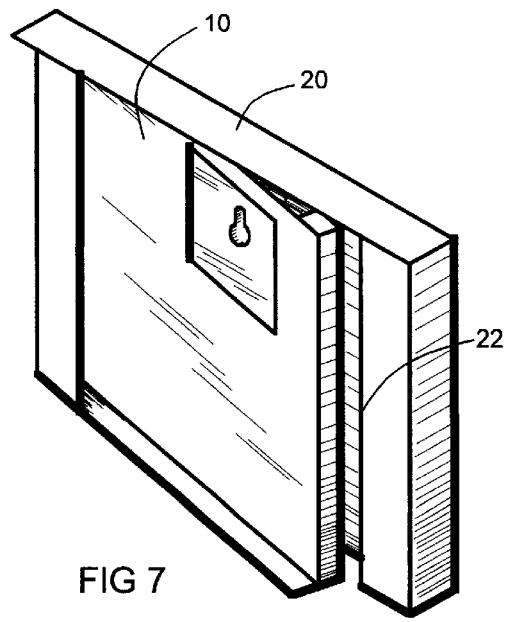
FIG. 7 is a CD case framer in open position.
Figure 8:
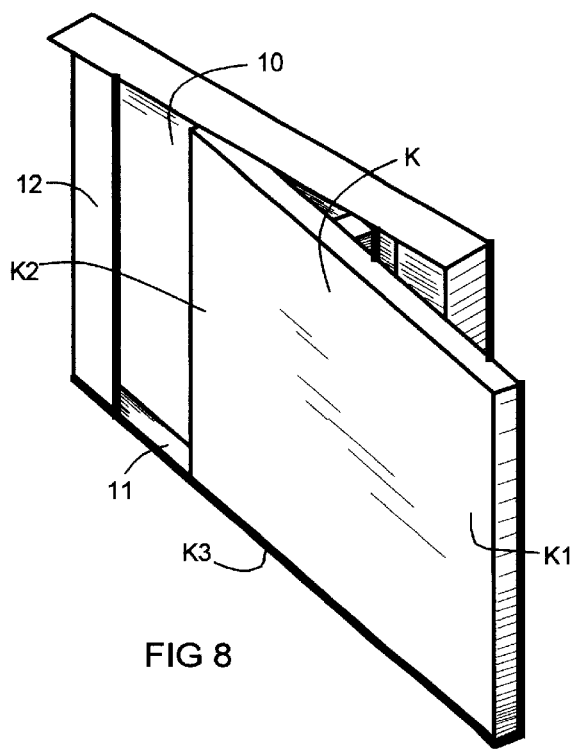
FIG. 8 is a CD case framer in open position and on the process of receiving or withdrawing a CD case.
Figure 9:
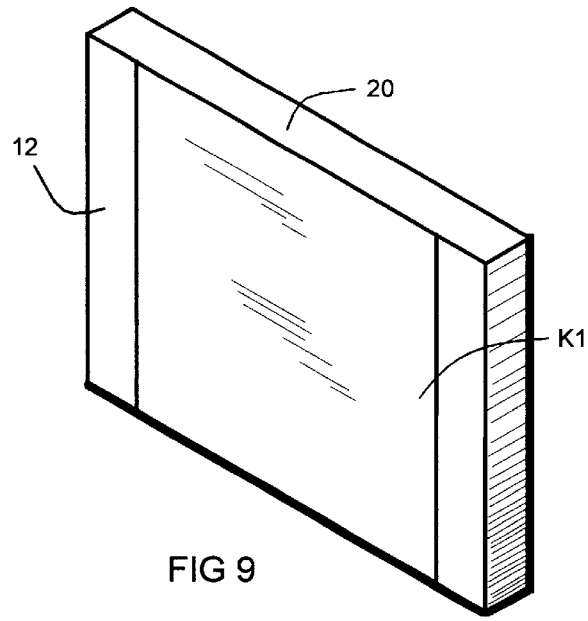
FIG. 9 is a CD case framer in close position loaded with a CD case.

Holder 10 should be in the "swing out" position. This is done by depressing bracket 12 perpendicularly towards housing 20 (FIG. 6). This simple lever action (FIG. 5) will raise the right side part of holder from 10 to 10' higher than wall 22 (FIG. 7). A CD K is slid sideways along holder 10 with CD bottom K3 riding over plate 11 (FIG. 8). CD K is slid further sideways until it is stopped by bracket 12. Bracket 12 contains CD's left most side K2. Then, CD right side K1 is depressed perpendicularly towards the housing 20. CD case framer is now in loaded and close position (FIG. 9). CD case is now secured on all sides and force of spring 13 makes a contact pressure between the CD case edge and the right side wall 22. Stopper 15 maintains a level distance between swing out holder and housing. This makes the CD case level and flushed with housing top and right side walls.

To unload CD K from CD case framer, bracket 12 is depressed perpendicularly towards housing 20. This lever action will bring CD side K1 out thereby clearing wall 22. CD K is now accessible for dismounting from holder 10 and withdrawal is assisted by the force of spring 13. The overall length of the swing out holder 10 is shorter than the length of the CD case K to permit convenient holding of CD side K1 during the process of unloading (FIG. 4).

An optimum position of pivot and the allowable depth of inward travel of holder 10 (FIG. 5) will give enough clearing distance of holder 10 from wall 22 to adequately remove a CD case from the holder.

I claim:

1. A device for framing a general use CD case whereby displaying the full front cover art of said CD case, comprising:

(a) a swing out holder made from a thin material comprising a plate having a perpendicular plate along a bottom edge of the plate and a right angle bracket at an end portion of the pate; a cut out is formed on a surface of the plate, and predisposed at a backside of said plate is a stopper, a pair of pivots, and (b) a fixed housing made from the same material having a plate and predisposed respective pair of pivots, perimeter walls, and a mounting means; said pivots of said housing is engaged to said pivots of said swing out holder.

2. A device as claimed in claim 1, wherein said perpendicular plate is a ledge perpendicular along a length of said plate of said swing out holder, the perpendicular plate is a means to hold the vertical weight of said CD case, made from the same thin material as the plate of said swing out holder and having a length approximately equal to the length of said holder.

3. The device as claimed in claim 1, wherein said bracket is a means to hold the said CD case vertically against the plate of said swing out holder by enclosing a left narrow strip of said CD case; the right angled faces of said bracket are perpendicular and parallel respectively to the plate of said swing out holder, the bracket is made out of the same thin material and having a length approximately equal to the width of said plate of said swing out holder.

4. The device as claimed in claim 1, wherein said cutout is an opening on said plate of said swing out holder; said cutout is a means to facilitate engagement of mounting means to a mounting pin when the fixed housing receives the swing out holder.

5. The device as claimed in claim 1, wherein said pair of pivots on said swing out holder, having an axis of swivel perpendicular to the length of said plate of said swing out holder, whereby when engaged to respective pivots makes the swing out holder an symmetrical level.

6. The device as claimed in claim 1, wherein said fixed housing having a width approximately equal to the width of said plate of said swing out holder.

7. The device as claimed in claim 1, wherein said pair of pivots of said fixed housing is mounted on a block, said respective pivots of said fixed housing engage the pivots of said swing out holder.

8. A device as claimed in claim 7, whereby when respective pivots of said fixed housing are engaged to pivots on said swing out holder; the swing out holder freely swivels within said fixed housing without interference from said perimeter walls, the heights of said perimeter walls are equal to the raised heights of said plate of said swing out holder and said bracket, and the width of the wall opposite to said bracket of said holder is equal to the width of the parallel face of said bracket.

9. The device as claimed in claim 8, said block is a means to elevate said pair of pivots on said fixed housing, thus allowing said swing out holder to swivel.

10. The device as claimed in claim 1, wherein said mounting means is a hole made on the plate o said fixed housing to receive a general use mounting pin; said mounting pin is anchored on a flat vertical surface.

11. The device as claimed in claim 1, wherein a means of ejecting a CD case is a spring.

* * * * *